Patented Mar. 13, 1923.

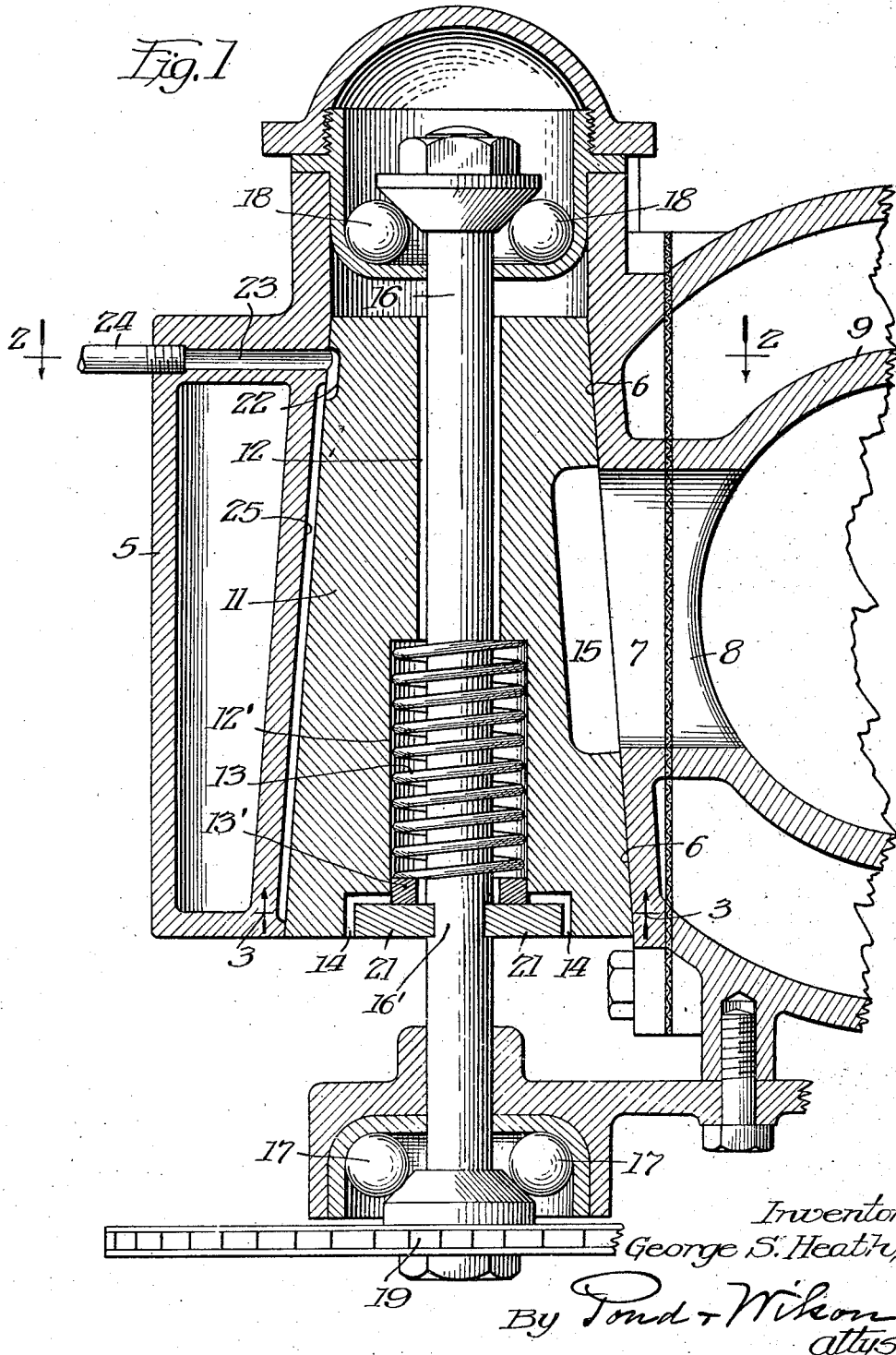

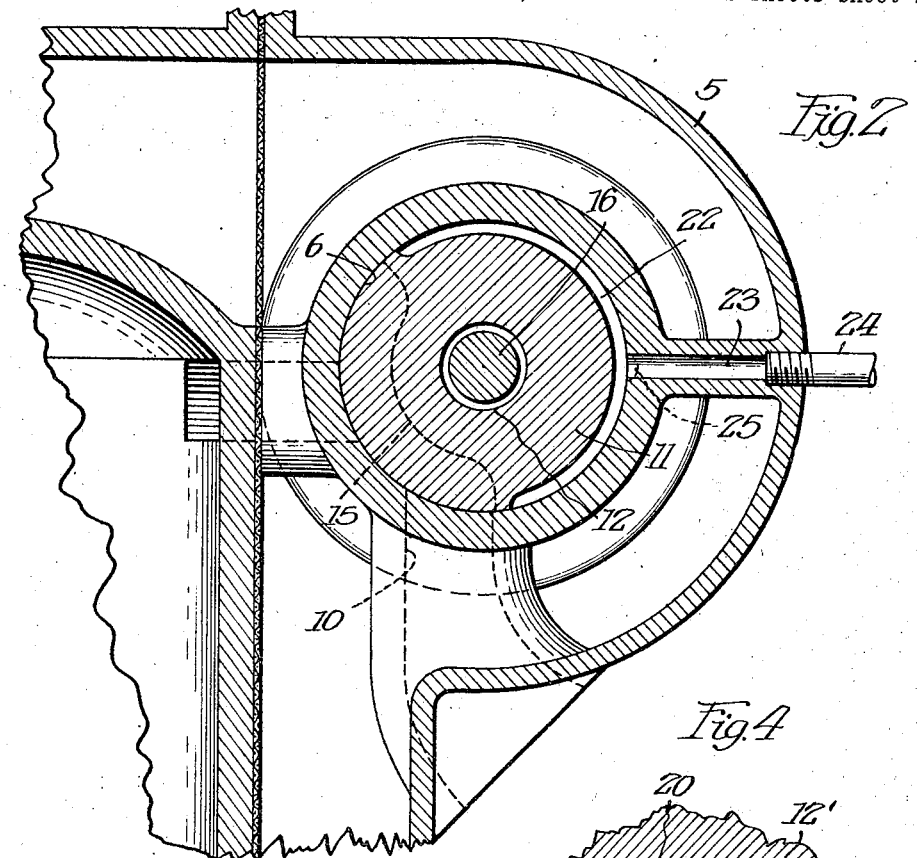
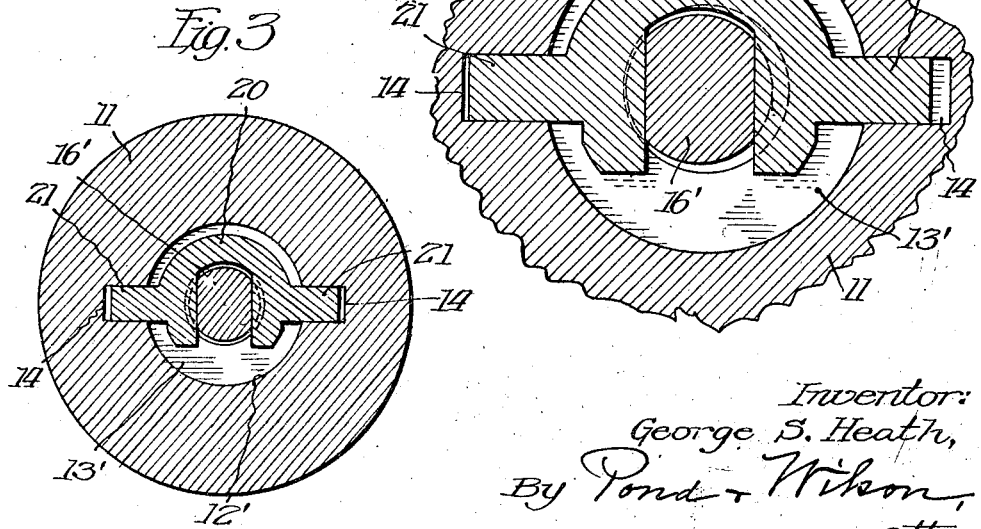

1,447,980

UNITED STATES PATENT OFFICE.

GEORGE S. HEATH, OF FORT BAYARD, NEW MEXICO.

ROTARY VALVE.

Application filed October 23, 1919. Serial No. 332,738.

*To all whom it may concern:*

Be it known that I, GEORGE S. HEATH, a citizen of the United States, residing at Fort Bayard, in the county of Grant and State of New Mexico, have invented certain new and useful Improvements in Rotary Valves, of which the following is a specification.

This invention relates to valve structures of the rotary type, and in its preferred form has reference more particularly to a conical valve, more especially designed for use on internal combustion and steam engines.

The main object of the invention is to provide a valve structure of the type above mentioned of superior reliability, efficiency, and durability for both inlet and exhaust service, and more especially one which, by reason of its novel structure and operating mechanism, will prevent leakage of motive fluid; and this object is attained by a construction in which the valve has no moving gas-tight joint other than between the surfaces of the valve and valve-seat, where wear is compensated by reason of an automatic adjustment of the valve on its seat under spring pressure, such automatic adjustment being permitted through the employment of an operating mechanism which permits a limited but sufficient side play of the valve in every direction to insure a gas-tight fit, so that the valve is held in alinement solely by, and has no other bearing surface than, the valve seat, and is self-adjusting in a manner independent of the valve operating mechanism or (in a multi-cylinder engine) the other corresponding valves.

Another object of the invention is to provide a rotary valve structure in which shall be incorporated an improved means for accurately controlling the distribution of oil for its lubrication without waste of oil or leakage into the port or ports controlled by the valve. My invention, its manner of operation, and the advantages inherent therein, will be readily understood and appreciated by those skilled in the art from the following detailed description, taken in connection with the accompanying drawings in which I have illustrated a practical and workable embodiment of the invention, and in which—

Fig. 1 is a longitudinal axial section of my improved rotary valve, showing also in cross-section a fragment of the cylinder served by the valve;

Fig. 2 is a cross-section on the line 2—2 of Fig. 1;

Fig. 3 is a cross-section on the line 3—3 of Fig. 1; and

Fig. 4 is a view similar to Fig. 3 illustrating the automatic universal radial adjustability of the valve relatively to its operating mechanism.

Referring to the drawings, 5 designates as an entirety a valve housing or casing formed with a conical valve seat 6, a lateral port 7 leading from said valve-seat and communicating with the lateral port 8 of an engine cylinder 9, and a lateral port 10 communicating with an intake or exhaust pipe (not shown).

Occupying the valve-seat 6 is a conical valve body 11, formed with an axial bore 12, this bore being enlarged at one end to form a socket 12′ for a coil compression spring 13. In one end of the valve body are formed a pair of oppositely disposed radial slots 14 communicating at their inner ends with the enlarged end 12′ of the bore. In one side of the valve body is formed an arcuate valve port 15 that once during each rotation of the valve affords a communication between the ports 7 and 10.

Extending through the bore of the valve is a driving shaft 16, that is journaled in anti-friction bearings 17 and 18, and may be operated by a chain and sprocket drive 19 as is usual in valves of this general type. This shaft 16 is of sufficiently less diameter than the valve bore 12 to afford considerable clearance between the two for the full length of the valve, as shown in Fig. 1, so that, although the shaft rotates the valve by means next to be described, it has no bearing in or on the valve.

In accordance with the present invention, the shaft 16 is drivingly engaged with the valve through a coupling which allows both a relative universal side play and end play between the shaft and valve, so that the valve can be self-adjusting to its seat without hindrance from or interference by the shaft. This coupling may take a variety of specific forms, but that herein shown comprises a yoke-like member 20 that straddles a flattened section 16′ of the shaft and is formed with a pair of oppositely extending arms 21 that lie in the slots 14 of the valve. It will be observed that the distance between the bottoms of the slots 14 is greater than the distance between the outer ends of the arms 21; so that the coupling member 20 is capable of a bodily shifting movement on the shaft in the direction of one diameter of the latter, and it is also bodily shiftable relatively to the valve in a direction at right angles to said diameter.

It will further be observed by reference to Fig. 1, that the yoke 20 and its arms 21 are somewhat narrower than the slots 14 of the valve, so that longitudinal motion in the valve 11 in an outward direction to the extent required for self-adjustment is opposed or restricted only by the tension of the spring 13.

The spring 13 is confined endwise under pressure in the socket 12' between the bottom of the latter and an annular washer 13' surrounding the shaft 16 with clearance, as shown in Fig. 1, and abutting against the yoke 20 and its arms 21; said spring serving to constantly urge the valve endwise to a snug fit on its seat. The washer 13' is not essential, and may be omitted if desired.

Effective lubrication of the valve is provided for by the following structural features. 22 designates an arcuate groove or channel formed in and transversely of the small end of the valve body 11; this channel, as shown in Fig. 2, terminating short of the lines marking the opposite longitudinal edges of the valve port 15. This channel 22 communicates during a portion of each revolution of the valve with an oil supply duct 23 formed in the valve casing and supplied with oil through a pipe 24. 25 designates an oil distributing groove or channel formed in and lengthwise of the valve seat one end of said channel 25 communicating during the same portion of each revolution of the valve with the channel 22; which latter, as shown in Fig. 1, is wide enough to overlap the adjacent ends of both the duct 23 and the channel 25. Oil is supplied under pressure or gravity, so that the distributing channel 25 is filled with oil under pressure except during that portion of the revolution when the inner end of duct 23 is cut off from channel 25 by the solid portion of the valve surface lying between the ends of the arcuate channel 22; this solid portion, it will be observed, lying opposite the end of the valve port 15, and thus preventing the oil from wasting into said port as the latter sweeps past the distributing channel 25 once during each revolution.

The manner in which the stated objects of the invention are secured will be readily apparent from the foregoing description, from which it will be seen that the conical valve body 11 is not only free to adjust itself lengthwise of its seat, but by reason of the clearance between its bore and the valve shaft 16 and the universal joint coupling between said shaft and valve, is free to automatically adjust itself in every radial direction to its seat, thus making it unnecessary to maintain the axis of the shaft always exactly coincident with the axis of the valve or valve seat, as illustrated in exaggerated form in Fig. 4. While, therefore, my construction provides for axial differences between the shaft and valve, it will be observed that it does not permit of any angular differences or lost motion in the direction of rotation which is very important in insuring permanent timing of the valve. All wear between the valve and its seat is also automatically taken up. And where a plurality of valves for a multi-cylinder engine are mounted on and driven by a single shaft (which is a common arrangement in practice) the described construction obviously makes each valve entirely independent of the others in respect to its capacity for automatic adjustment to its seat. It will also be apparent that the oiling features described and shown insures an ample supply of lubricant to the valve and its thorough distribution over the latter without any appreciable waste through the valve and cylinder ports.

I have herein shown and described one practical embodiment of my invention, but it is manifest that the details of structure and arrangement may be considerably modified without involving any departure from the principle of the invention or sacrificing any of the advantages thereof. Hence, I reserve all such variations and modifications as fall within the spirit of the appended claims.

I claim—

1. In a rotary valve structure, the combination of a conical valve-seat, a valve cooperating with said seat and formed with an axial bore and with oppositely disposed radial slots, spring means urging said valve endwise to a snug fit on said seat, a valve-actuating shaft of less diameter than the bore of said valve and extending through said bore, said shaft having a flattened portion, the flat sides of which lie at right-angles to said slots, and a coupling yoke straddling the flattened portion of said shaft and slidable thereon in the direction of said flat sides and formed with radially extending arms lying in said slots and slidable lengthwise of the latter.

2. In a rotary valve structure, the combination of a conical valve-seat, a valve cooperating with said seat and formed with an axial bore having an enlarged portion at one end forming a spring socket and with oppositely disposed radial slots communicating at their inner ends with said socket, a valve-actuating shaft of less diameter than the bore of said valve and extending through said bore, said shaft having a flattened portion the flat sides of which lie at right angles to said slots, a coupling yoke straddling the flattened portion of said shaft and slidable thereon in the direction of said flat sides and formed with radially extending arms lying in said slots and slidable lengthwise of the latter, and a compression spring housed in said socket and confined endwise between the bottom of said socket and said coupling yoke.

3. In a rotary valve structure, the combination of a valve housing having a conical valve seat formed with a longitudinal oil-distributing channel extending approximately the full length thereof and also having an oil supply duct opening through said valve seat slightly beyond one end of said oil-distributing channel, and a rotary valve co-operating with said valve seat, said valve having a port extending transversely of a portion of the circumference thereof and also having an arcuate channel extending transversely of the remaining portion of the circumference of said valve and lying beyond the transverse plane of one side of said port, said arcuate channel being of sufficient width to register with the proximate ends of said distributing channel and supply duct.

GEORGE S. HEATH.